US007577313B1

(12) United States Patent
Georgiev

(10) Patent No.: US 7,577,313 B1
(45) Date of Patent: Aug. 18, 2009

(54) GENERATING SYNTHESIZED TEXTURE IN DIFFERENTIAL SPACE

(75) Inventor: Todor G. Georgiev, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 801 days.

(21) Appl. No.: 10/842,920

(22) Filed: May 11, 2004

(51) Int. Cl.
*G06K 9/36* (2006.01)
*G06K 9/00* (2006.01)
(52) U.S. Cl. ...................................................... 382/284
(58) Field of Classification Search ................. 382/173, 382/199, 218, 219, 254, 272, 284, 275–277, 382/289, 294
See application file for complete search history.

(56) References Cited

U.S. PATENT DOCUMENTS

| 5,715,334 | A  | * | 2/1998  | Peters ........................ 382/254 |
| 5,850,471 | A  | * | 12/1998 | Brett ......................... 382/162 |
| 5,898,464 | A  | * | 4/1999  | Cho .......................... 348/625 |
| 6,266,054 | B1 |   | 7/2001  | Lawton et al. .............. 345/326 |
| 6,529,638 | B1 | * | 3/2003  | Westerman ................. 382/275 |
| 6,587,592 | B2 |   | 7/2003  | Georgiev et al. ........... 382/254 |
| 6,593,933 | B1 |   | 7/2003  | Xu et al. .................... 345/586 |
| 6,674,905 | B1 | * | 1/2004  | Matsugu et al. ............ 382/199 |
| 6,985,263 | B2 |   | 1/2006  | Georgiev et al. ........... 358/3.26 |
| 7,248,745 | B1 | * | 7/2007  | Georgiev et al. ........... 382/254 |

FOREIGN PATENT DOCUMENTS

EP 0 784 293 7/1997

WO WO 97/06477 2/1997

OTHER PUBLICATIONS

Alexei A. Efros and Thomas K. Leung, "*Texture Synthesis by Non-parametric Sampling*," IEEE International Conference on Computer Vision, Corfu, Greece, pp. 6, Sep. 1999.
Patrick Perez, Michel Gangnet, and Andrew Blake, "*Poisson Image Editing*," pp. 313-318, 2003.
Li-Yi Wei and Marc Levoy, "*Fast Texture Synthesis using Tree-structured Vector Quantization*," pp. 1-10.
Iddo Drori, Daniel Cohen-Or, and Hezy Yeshurun, "*Fragment-Based Image Completion*", pp. 303-312, 2003.
Marcelo Bertalmio, *Simultaneous Structure and Texture Image Inpainting*, pp. 1-13.
Marcelo Bertalmio et al, Image Inpainting, Proceedings of SIG-GRAPH 2000, New Orleans, USA, Jul. 2000, pp. 1-11.
William L. Briggs, "A Multigrid Tutorial", copyright 1987; chapter 1-3, pp. 1-50.

(Continued)

*Primary Examiner*—Amir Alavi
(74) *Attorney, Agent, or Firm*—Fish & Richardson P.C.

(57) ABSTRACT

A method and system for generating a portion of an image uses n differential representations of an image texture, with n>1, which are mixed to produce a synthesized texture. The n differential representations are modified by weighting each differential representation using a corresponding coefficient, where a sum of squares of the coefficients is equal to a value of approximately one. The n modified differential representations are then combined to produce a combined differential representation, and the combined differential representation is integrated to obtain a modified texture region.

48 Claims, 5 Drawing Sheets

OTHER PUBLICATIONS

Anil N. Hirani et al, "Combining Frequency and Spatial Domain Information for Fast Interactive Image Noise Removal", Proceedings of SIGGRAPH 96 (New Orleans, LA, Aug. 4-9, 1996). In *Computer Graphics* Proceedings, Annual Conference Series, 1996, *ACM SIGGRAPH*, pp. 269-276.

Homan Igehy et al, "Image Replacement Through Texture Sythesis", *Proceedings of the 1997 IEEE International Conference on Image Processing*, pp. 186-189.

Manuel M. Oliveira, "Fast Digital lmage Inpainting", Proceedings of the International Conference on Visualization, Imaging and Image Processor (VIIP 2001), Marbella, Spain, Sep. 3-Sep. 5, 2001, pp. 261-266.

Supplementary Partial European Search Report, European Application No. 02803623-4 - 2218, Sep. 19, 2006, pp. 1-4.

C. Ballester et al., A Variational Model for Filling-In Gray Level and Color Images, Proceedings of the Eight IEEE International Conference on Computer Vision, Jul. 7-14, 2001, vol. 1, of 2. Conf. 8, XP010553957, pp. 10-16.

C. Ballester et al., Filling-In by Joint Interpolation of Vector Fields and Gray Levels, IEEE Transactions on Image Processing, Aug. 8, 2001, vol. 10, XP011025817, pp. 1200-1211.

Supplementary European Search Report, European Application No. 02803623.4 - 2218, Oct. 30, 2006, pp. 1-7.

Alexei A. Efros et al., Texture Synthesis by Non-parametric Sampling, 1999 IEEE, pp. 1033-1038.

Li-Yi Wei et al., Fast Texture Synthesis using Tree-structured Vector Quantization, Computer Graphics Proceedings, Annual Conference Series, 2000, XP001003589, pp. 479-488.

European Communication pursuant to Article 96(2) EPC, European Application No. 02803623.4 - 1522, Mar. 23, 2007, pp. 1-4.

\* cited by examiner

GENERATING SYNTHESIZED TEXTURE IN DIFFERENTIAL SPACE

CLAIM OF PRIORITY

This application claims priority under 35 USC § 120 to pending U.S. patent application Ser. No. 10/748,013, filed on Dec. 30, 2003, the entire contents of which are hereby incorporated by reference.

TECHNICAL FIELD

This description relates to generating new data values for an image region, for example, generating textured image data values using an image texture sample.

BACKGROUND

Traditional techniques for removing unwanted features from images include wire removal techniques such as are used in movies, dust and scratches filters used in software applications such as PHOTOSHOP®, provided by Adobe Systems, Inc. of San Jose, Calif., inpainting, and other algorithms. In typical replacement pixel data generation techniques, selected pixels in an image are regenerated based on values of the pixels bordering the selected pixels and on first and second order partial differential equations (e.g., the Laplace equation). For example, traditional inpainting techniques generally are based on second order the Laplace equation and/or anisotropic diffusion. These techniques often result in noticeable discontinuities at the edges of the inpainted region.

Other techniques of generating replacement data values in an image region include applying area operations such as blurring or performing median calculations (e.g., using Gaussian filters and median filters) at each pixel in the selected region. The image area, or neighborhood, used for the area operation generally will include one or more selected pixels with undesirable data values. Thus, the neighborhood needs to be large enough to swamp the contributions of the undesirable pixel data. Oftentimes, a user must specify how large to make the neighborhood to minimize the effects of the undesirable data values. For example, techniques that are based on frequency domain separations generally require that the user specify a neighborhood size that will be used by the filter that separates gross details from fine details.

Some conventional techniques also apply a high-frequency component from another image to a healed region after it has been modified to replace defective pixel values. But the results of such traditional techniques for removing unwanted features of an image often do not reflect the true properties of most images. Areas of images that are filled-in using conventional techniques frequently have discontinuities at the boundary of the filled-in region and/or look blurred or otherwise appear to lack detail. These filled-in areas are often easily noticed and do not look like a natural part of the image, either because the surrounding areas are textured, or because pixel intensity changes sharply at the boundary of each filled-in area.

Another technique for generating data values for an image is texture synthesis. Texture synthesis algorithms synthesize new texture based on sample texture by simply copying pixels from the sample texture to a new location so they match the texture pattern. As a result, a potentially unlimited area of new texture may be "grown" from a small "seed" of sample texture. One example of a texture synthesis algorithm is the Pattern Maker feature in PHOTOSHOP® image editing software. Because texture synthesis techniques essentially grow texture from an existing texture image outward, such techniques are useful for growing an object bigger. If texture synthesis is used to fill in an area within an existing image, however, colors typically do not match at some of the boundaries between the existing image and the synthesized texture or where two regions of synthesized texture meet.

Traditional techniques for modifying images also include image enhancement techniques used to address recurring visual anomalies, such as by obtaining dynamic range compression. Land's "Retinex" theory has been used in a number of image enhancement techniques that apply a defined modification to an image to address dynamic range and color constancy issues. Defined techniques for adjusting shadow and highlight detail in images are also available. For example, one technique can assist in removing shadows from images and involves duplicating, blurring and inverting an image, followed by combining the image with the original image in Color Dodge mode in PHOTOSHOP® software. Although the sequence of steps in this technique may be considered relatively strange, they can produce useful results in adjusting shadow and highlight detail in images.

SUMMARY

Techniques may be employed for removing unwanted features from images. The techniques may provide replacement texture that provides both consistent texture and color at the boundaries between the replacement image regions and the original image. A modified image may be provided by combining replacement texture samples in differential space. The resulting differential texture representation is then integrated, using the original image pixel values to provide boundary conditions, to produce the replacement image region.

The essence of texture is in the differential space representation, rather than in the pixel values. By generating texture in differential space, replacement texture is generated in a more natural and less complicated manner. Then, a Poisson equation is solved using the differential space representation of the texture as a source term and the original pixel values at the boundary of the replacement texture region as a boundary condition. The solution of the Poisson equation brings the replacement texture back to a normal pixel representation, while at the same time generating a healed image.

In one general aspect, a portion of an image is generated by first obtaining n differential representations of an image texture, with n>1. The n differential representations are modified by weighting each differential representation using a corresponding coefficient, where a sum of squares of the coefficients equal to a value of approximately one. The n modified differential representations are combined to produce a combined differential representation, and the combined differential representation is integrated to obtain a modified texture region.

Implementations may include one or more of the following features. The n differential representations of an image texture can be obtained by calculating a differential representation of an original image texture region and shifting the differential representation in one or more directions to generate multiple shifted versions of the differential representation. Each one of the shifted versions of the differential representation can be one of the n differential representations. The differential representations can be shifted by a random value in at least two directions. The n differential representations of an image texture can alternatively be obtained by calculating differential representations of each of multiple original image texture regions.

Each coefficient is equal to approximately one divided by the square root of n. The modified texture region is used to replace a modification region in an original image and integrating the combined differential representation can be performed using pixel values from the original image as a boundary condition. An identification of the modification region in the original image is received, and a boundary region in the original image is determined. The boundary region is adjacent to the modification region and comprises the pixel values from the original image that are used as a boundary condition. The n differential representations are uncorrelated.

Each of the n differential representations has an average value of approximately zero and the n differential representations have approximately the same standard deviation. Integrating the combined differential representation to obtain the modified texture region involves iteratively applying one or more kernels to generate a solution to a partial differential equation having a source term corresponding to the combined differential representation. The partial differential equation is a Poisson differential equation. The n differential representations are a gradient, a Laplacian, a gradient of the Laplacian, or a second Laplacian. The n differential representations can be determined using at least one predefined kernel. The image texture, the n differential representations, and the modified image can correspond to one channel of a multiple channel image.

In another general aspect, an image can be modified by receiving an identification of a modification region in an original image and determining a boundary region in the original image. The boundary region is adjacent to the modification region. Texture is generated in differential space to produce a synthesized differential representation for the modification region, and the synthesized differential representation is integrated to generate a modified image. The synthesized differential representation is integrated by calculating a solution to a partial differential equation using the boundary region as a boundary condition.

The invention can be implemented to realize one or more of the following advantages. Texture of virtually any size can be synthesized so that it matches colors at a boundary and so that it matches the textural characteristics of a texture sample. In addition, the synthesized texture can have a random appearance so that large-scale features or patterns in the texture sample are not necessarily repeated.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
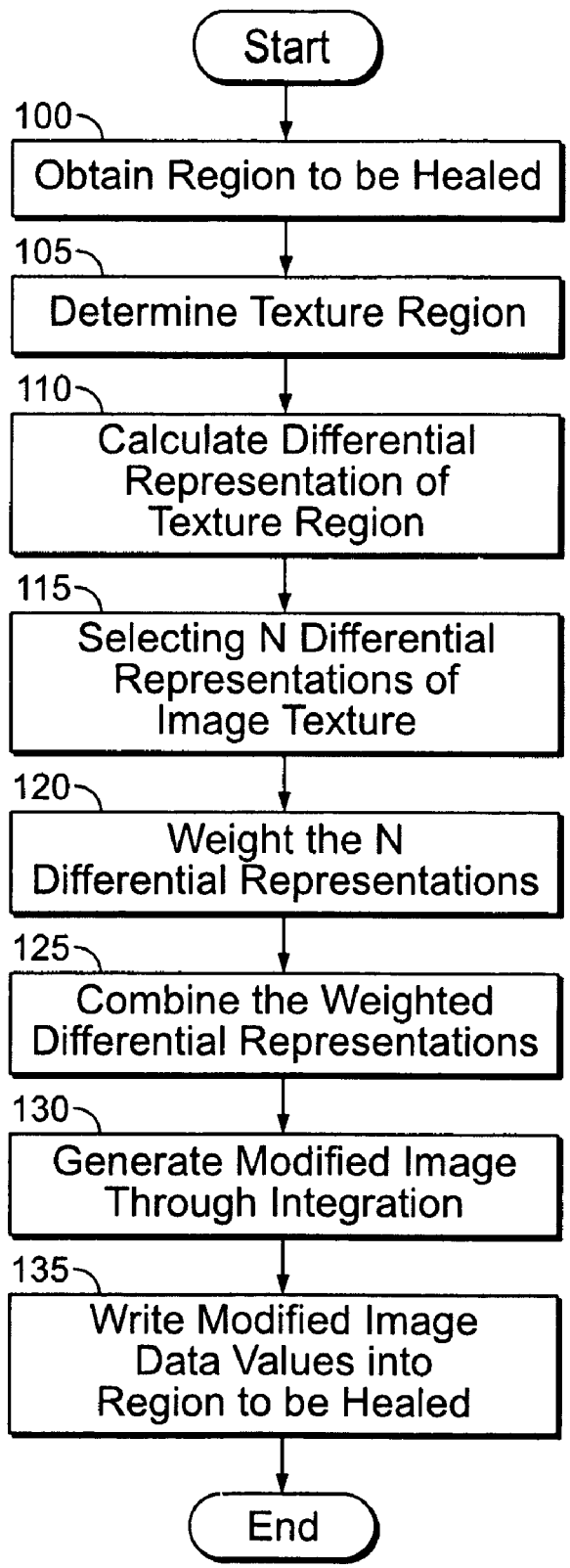
FIG. 1 shows a process for generating new data values for a modification region of an image using data values bounding the modification region and using data values for a texture region.

The systems and techniques described here relate to generating new data values for an image region. New data values are generated using boundary pixel data values and one or more samples of textured data values. The new data values can be written into the image region to heal an image, particularly by generating visual texture to replace an unwanted feature of the image, or can be used as input for further processing. The terms "texture" and "textured" encompass both small-scale and large-scale patterns, ordered and/or repeating patterns, and unordered and/or non-repeating patterns. Texture, in the context of visual images, can relate to surface characteristics of virtually any type of object, for example, as well as many other types of image characteristics, such as light inflections and color inflections. Examples of surfaces or images that may exhibit texture include water, metal, fabric, terrain, clouds, stone, wood, flowers, leaves, and flooring materials. Surfaces may include one or both of small-scale and large-scale textures.

The term "heal" means modification of an image to effect a desired change, and generally includes the concept of removing any unwanted feature of an image. Furthermore, the following description frequently discusses image healing in the context of discrete images, which are images composed of a finite set of pixel data values (e.g., 24 bit per pixel digital images such those used in RGB (Red, Green, Blue) color systems), but may apply equally in other contexts, including other data bit-to-pixel schemes and other color spaces.

Examples of unwanted image features include artifacts that have arisen through an image capture or storage process (e.g., scratches, dust, or other imperfections that do not correspond to an underlying abstract image) and unwanted elements in an image (e.g., wires in a special effects shot, graffiti, a person or other object that interferes with a desired effect of the image, or any other undesirable feature of an underlying abstract image). The systems and techniques described can be used to remove or alter relatively large elements of an image, thereby serving as a creative tool in addition to a tool for removing small artifacts.

In the following description, various operations are described as being performed on, or applied to, an image or portions of an image. In general, these operations can be performed on the image or image portion directly or can be performed on one or more copies of the image or image portion. Under certain circumstances, performance advantages may arise by making one or more copies of an image or image portion and then applying the image processing operations to the copies rather than to the original image directly. When processing is described with respect to an "image," this processing may be performed against an original image, a portion of an original image, a copy of an original image, a copy of a portion of an original image, a portion of a copy of an original image, or additional copies/portions of any of these. When processing is described with respect to an "image copy," this processing alternatively may be performed against the original image.

In healing an area of an image, the ultimate goal may be to generate new pixel data values for a region of the image to be healed (i.e., a modification region). The new pixel data values for the modification region are such that, when written to the modification region, the resulting image is smooth. Smoothness does not imply that the values are continuous across the boundary. Rather, smoothness means that the average pixel values and the average change in pixel values are consistent across the boundary. Thus, the pixel values may change (drastically, in some cases), but the pixel values and the change in pixel values are the same or similar inside the boundary and outside the boundary.

For example, for a multi-channel discrete image, such as an RGB image, smoothness in pixel data values at the boundary can be created for all three channels, thus resulting in similar overall gradations of color and illumination across the boundary of the modification region when the new pixel data values are written into the modification region. The resulting image is noticeably smoother at the boundary of the modification region than may be accomplished by conventional techniques. The description below discusses only the single channel case, but the systems and techniques described below are equally applicable to multi-channel images. Additionally, these systems and techniques can be used with multiple color spaces, either separately or concurrently. For example, an image can be converted into another color space (e.g., an RGB image can be converted to an LUV or a YUV color space), healed in that other color space, and then converted back.

This smoothness at the boundary can be improved by creating more than two orders of consistency at the boundary. This process may be understood mathematically in terms of functions and derivatives of functions. More particularly, the underlying abstract image can be represented mathematically as an image function. Similarly, a portion of the image corresponding to the modification region plus the boundary region also can be represented as an image function. The new pixel data values may be generated such that, when placed in the modification region of the image, the resulting image function corresponding to the modification region plus the boundary region is smooth. Thus, the average pixel values for the resulting image function are consistent, the first derivatives of that function are consistent and one or more higher derivatives (second, third, etc.) are consistent. In other words, the new pixel values depend not only on the pixel values at the boundary, but also on multiple higher-order partial derivatives of the pixel values in the boundary region, which may be two or more pixels wide, thereby producing increased smoothness at the boundary. Following generation of the new pixel data values, these data values can be written into the modification region of the image to be healed or used as inputs for further image processing.

FIG. 1 shows a process for generating new data values for a modification region of an image using data values bounding the modification region and using data values for a texture region. In general, the data values may represent pixel values associated with one or more color channels for an image. The process begins by obtaining information defining a modification region of an image to be healed (step 100). The modification region can be a portion of an original digital image that can include a rectangular region within the image, an arbitrarily shaped connected region within the image, or an arbitrarily shaped unconnected region within the image, such as a region specified by a user.

The original image can be a received image, such as image data loaded from a storage device or received over a network or received from an image generating system/device (e.g., a camera or scanner). The original image can be separated into one or more color channels (or other types of channels) for processing. For example, the original image can be separated into RGB components. Each channel can then be treated essentially as a grayscale image with each pixel in the image having a value corresponding to the grayscale or color intensity of that pixel. In the case of a black and white image, the image may be processed in a single grayscale channel.

The modification region may be identified in a number of different manners depending upon the application. For example, a user of a software program can use a brush tool to paint a mask onto the original image, thereby defining the modification region. The brush tool can have clearly defined edges, or it may represent a density function (e.g., the brush may have fuzzy or feathered edges). Alternatively, a user can designate a mask (e.g., using selection tools such as those in PHOTOSHOP® software).

The modification region may also be identified automatically. For example, a feature recognition or statistical analysis can be performed on an original image to identify artifacts or other undesirable features.

Information defining one or more texture regions is also obtained (step 105). The texture regions generally include representations of a texture to be used in generating the new data values for the modification region. The texture regions serve as a source image that defines the desired textural characteristics for the new data values. The texture regions may be portions of the original image that can include one or more rectangular areas within the image, an arbitrarily shaped connected area within the image, or arbitrarily shaped unconnected areas within the image, such as one or more areas specified by a user. The texture regions may alternatively or additionally include texture representations that are provided by one or more separate images (e.g., from different pictures or from different frames in a video) or texture region models. A single texture region may be used to generate multiple different texture representations by shifting the texture region image in the x and y directions by random or predetermined amounts or by resizing the texture region.

The texture regions may be identified in a number of different manners depending upon the application. For example, a user of a software program can use a brush tool to paint a mask onto the original image, thereby defining the texture region or regions. The brush tool can have clearly defined edges or it may represent a density function (e.g., the brush may have fuzzy or feathered edges). Alternatively, a user can designate a mask (e.g., using selection tools such as those in PHOTOSHOP® software). The texture regions may also be identified automatically. For example, a feature recognition or statistical analysis can be performed on an original image to identify textures near a boundary of the region to be healed. Thus, the texture regions may overlap a boundary region or even portions of the modification region (if such portions do not include the unwanted features).

A differential representation of each texture region is calculated (step 110). The differential representation provides information about rates of change across pixels of a texture source image in the form of a value mapping of the rates of change. Each value in the value mapping corresponds to a pixel in the texture source image and indicates a general rate of change between the pixel and at least one adjacent pixel. The general rate of change can correspond to a second derivative (i.e., a rate of a rate of change) or Laplacian derivative or to some other order of derivative (e.g., a fourth-order derivative). In some cases, a differential representation of the entire original image may be calculated. The texture region differential representations may be selected from the differential representation of the original image. The differential representations may be calculated by applying one or more kernels to the original pixel values. Many different kernels may be used to generate differential representations of the texture region (i.e., source images). For example, the kernels may be selected such that their application results in a Laplacian derivative of the texture region. Thus, a Laplacian of the source image may be calculated:

$$h(x,y)=\Delta f(x,y),$$

where $\Delta$ is the Laplace operator $$\Delta = \frac{\partial^2}{\partial x^2} + \frac{\partial^2}{\partial y^2}, h(x, y)$$

represents the differential representation of the source image (i.e., the texture region), and f(x,y) represents the source image. Combinations involving the texture region differential representation may then be performed in differential space (i.e., using h(x,y)) to produce a differential representation s(x,y) for the modification region. Other higher order differential representations of the source image can be calculated. A user can specify the type of differential representation to be used.

In a basic implementation, the differential representations can be a first-order differential representation. Optionally, in more complex implementations, a higher-order differential representation of a texture region or boundary region image f can be used. For example, the differential representation can be gradient values ($\nabla f$), Laplacian values ($\Delta f$), gradient of the Laplacian ($\nabla \Delta f$), or second Laplacian ($\Delta \Delta f$) calculated from the texture region or boundary region image. The various differential representations capture changes among pixels of different differential orders, and the user may specify which differential order to use. Alternatively, which differential order is used may be determined automatically (e.g., according to a predetermined setting).

Generally, each differential representation includes a plurality of values, with each value corresponding to a pixel in the original image. The values for each differential representation have an average value of approximately zero because the values represent differentials and some of the values are positive (i.e., greater than zero) while others are negative (i.e., less than zero). In some implementations, results are improved if the n differential representations are uncorrelated or orthogonal, which means that the dot product between vectors representing any two of the differential representations is zero (or approximately zero, which is typically true for different differential representations of real images). In addition, results may also be improved if the n differential representations have approximately the same standard deviation.

Multiple different differential representations of the image texture are selected (step 115). In general, n differential representations are selected with n>1. Larger n generally tends to reduce the noticeable effect of each differential representation on the final image to be generated although it increases the number of computations to be made. Typically, n is significantly greater than 1, and, depending on the type of texture, satisfactory results may be achieved with, e.g., n=25, n=50, n=100, n=250, etc. Any number of differential representations can be combined. As n becomes larger, however, there may be a point at which additional differential representations do not provide noticeable improvements in the final image. The n differential representations can be selected from the one or more differential representations calculated at step 110. In addition, the n differential representations can be selected from "shifted" versions of the one or more differential representations (e.g., by displacing each differential representation by a random amount in the x and y directions). The n differential representations can also be selected from differential representations of shifted versions of the one or more texture regions. Thus, shifting might be performed before or after calculating the differential representation(s). The n differential representations can also be obtained using resized versions of previously calculated differential representations or of texture regions before calculating differential representations.

The n differential representations are each weighted (step 120). In some implementations, each differential representation is weighted by multiplying the differential representation by $$\frac{1}{\sqrt{n}}.$$

Thus, each differential representation is multiplied by the same amount $$\left(\text{i.e., } \frac{1}{\sqrt{n}}\right).$$

In other implementations, the various differential representations are multiplied by differing amounts (e.g., $$\frac{1}{\sqrt{n}} + 0.1, \frac{1}{\sqrt{n}} - 0.1,$$

etc.) thereby weighting some terms by a greater or lesser amount than others. The differential representations can also be weighted by an amount that is the same for each differential representation but that differs from $$\frac{1}{\sqrt{n}}.$$

The weighting coefficient can be approximately equal to $$\frac{1}{\sqrt{n}},$$

can average $$\frac{1}{\sqrt{n}},$$

and/or the sum of the squares of the various weighting coefficients can be approximately equal to 1 (e.g., $C_1^2+C_2^2+\ldots+C_n^2 \cong 1$, where $C_i$ is the weighting coefficient for differential representation i, for i=1 to n).

The n weighted differential representations are combined (step 125) by adding them together to obtain a combined differential representation. Thus, steps 120 and 125 can be mathematically represented by:

$$w(j)=C_1x(j)+C_2y(j)+C_nZ(j)$$

where w(j) is a vector (e.g., j=1 to 10,000 for a 100×100 pixel image) that corresponds to the combined differential representation and x(j), y(j), and z(j) are vectors that correspond to the first, second, and nth differential representations.

Typically, when mixing n images, each image is weighted by $$\frac{1}{n}.$$

A weighting coefficient of $$\frac{1}{n}$$

ensures that the average color of the resulting mixed image is approximately the same (or is the average of) the various images that went into the mixture. As n becomes large, however, the mixed image tends toward a consistent color across the pixels in the mixed image. Similarly, using weighting coefficients of $$\frac{1}{n}$$

in differential space tends to average out the differential pixel values and removes the changes in values that represent texture. By using weighting coefficients of approximately $$\frac{1}{\sqrt{n}}$$

or where the sum of the squares of the weighting coefficients is approximately one, the standard deviation, and thus the texture information, of the combined differential representation (e.g., w(j)) is approximately the same as that of the component differential representations (e.g., x(j), y(j), and z(j)). This technique results in a combination that would be far too bright if the values represented pixel colors. Because the values represent changes in pixel colors, however, the technique does not create problems with brightness.

The weighting coefficients can vary to some degree from a value of $$\frac{1}{\sqrt{n}},$$

or from values for which a sum of the squares equals one, without necessarily having a noticeable effect on the resulting image. As the weighting coefficients vary significantly from these amounts, however, the variance begins to have a more noticeable effect. As the weighting coefficients become smaller $$\left(\text{e.g., approaching } \frac{1}{n}\right),$$

textural characteristics of the resulting image tend to be muted by reducing the standard deviation of the pixel values, while larger weighting coefficients $$\left(\text{e.g., greater than } \frac{1}{\sqrt{n}}\right)$$

tend to exaggerate the texture by increasing the standard deviation of the pixel values.

Next, a modified image is generated from the combined differential representation by solving a Poisson differential equation (step 130). The combined differential representation is used as a right hand side of the equation, and boundary pixel values from the original image are used as Dirichlet boundary conditions (i.e., to ensure that the modified image is consistent in color at the boundary). The boundary region is a set of pixels that bounds the modification region in the original image and extends outward from the modification region at least far enough to support solving the Poisson equation. For example, the boundary region may be a two-pixel deep band surrounding the modification region. In some implementations, the entire original image may be used as the boundary region even though the entire image may not be necessary to perform the integration techniques described below. The solution to the Poisson equation provides pixel values for a new texture image. The pixel values exhibit the general rates of change as indicated by the combined differential representation and exhibit consistency in color and brightness with the pixel values in the boundary region of the original image.

The type of Poisson equation solved and the technique used depend on the differential representation and the computing resources available. Generating the modified image can involve iteratively applying one or more kernels to the differential representation of the modification region to generate a solution to a Poisson equation, in which the combined differential representation is the source term and the boundary pixel values are used as a boundary condition. The use of kernels to generate a solution is described in U.S. patent application Ser. No. 10/748,013, filed Dec. 30, 2003, which is incorporated by reference.

Many different kernels may also be used to integrate the combined differential representation and thus to generate new pixel data values (i.e., for the modified image) that result in consistent values and consistent change in values at the boundary of the selected modification region. Moreover, multiple kernels may be used to generate new pixel data values that result in multiple orders of consistency at the boundary of the selected region.

For example, the kernels may be selected such that their iterative application results in a solution to a Poisson-type equation, which may be of orders higher than the traditional Poisson equation. Thus, each channel may be a solution of the Poisson equation with given boundary conditions:

$$\Delta g(x,y) = s(x,y),$$

where g(x,y) represents the modified image (e.g., resulting from step 130) and s(x,y) is the source term, which represents the combined representation (e.g., resulting from step 125). The solution is smooth at the boundary. The fourth order equation (or even higher order equations) may also be used:

$$\Delta^2 g(x,y) = s^2(x,y),$$

where $\Delta^2 = \Delta \cdot \Delta$ (i.e., Laplacian squared).

In generating the modified image from the starting image and the combined differential representation, as discussed above, the type of differential equation to be solved may depend on the type of differential representation selected. For the differential representations of gradient, Laplacian, gradient of the Laplacian, and second Laplacian, the equations to solve are $\Delta f = \nabla s$, $\Delta f = s$, $\Delta\Delta f = \nabla s$, and $\Delta\Delta f = s$. Solving such equations can involve iteratively applying one or more kernels.

Finally, the modified image is inserted into the modification region of the original image (step 135). The result is an image in which the modified image matches the texture of the texture regions and matches relatively seamlessly with the boundary pixels of the original image.

New pixel data values for a region of an image can be generated by solving the Poisson equation using multi-resolution processing and image tiling, which optionally can be used to enhance performance, as described in U.S. patent application Ser. No. 10/748,013, filed Dec. 30, 2003. Multi-resolution processing involves generating multiple different resolutions of an image, and then successively processing each different level (from the lowest resolution to the highest resolution) passing information from one processing level down to the next until converging on a final result.

One way to ensure that the n differential representations are uncorrelated or orthogonal and have approximately the same standard deviation is to use a single texture region, or a single differential representation of a texture region, that is shifted multiple times in the x and y directions. Each different shift of the original texture region or the differential representation thereof produces a different differential representation. An image can be shifted by a predetermined amount or a random amount. A potential danger with shifting by a non-random amount, however, is that if the shift distance corresponds to some repeating structure in the image, the shifted image may be correlated with the original image, which can cause characteristics of the original image to become exaggerated when the shifted image (or differential representations thereof) is combined with the original image (or differential representations thereof). Thus, the use of random values for the shifts in the x and y directions may help ensure orthogonality. Images can also be shifted in more than two directions (e.g., a three dimensional image can be shifted in the x, y, and z directions).

Figure 2A:
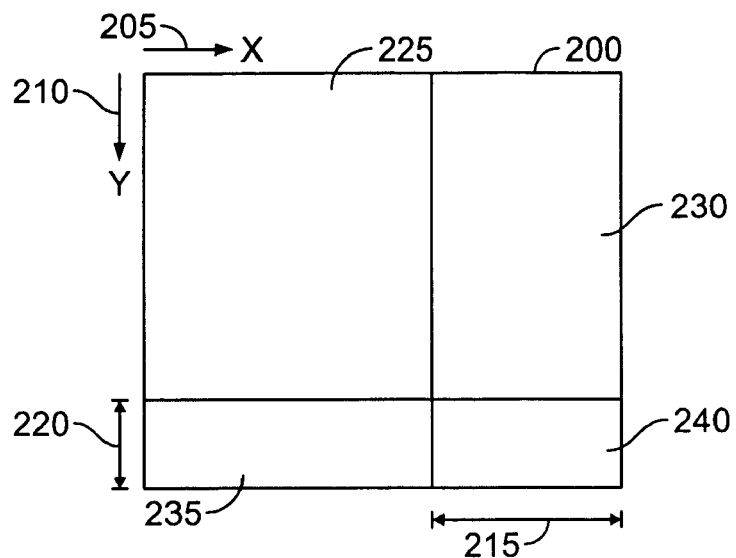
FIGS. 2A and 2B illustrate a technique for shifting an image or a differential representation of an image for producing multiple uncorrelated differential representations.
Figure 2B:
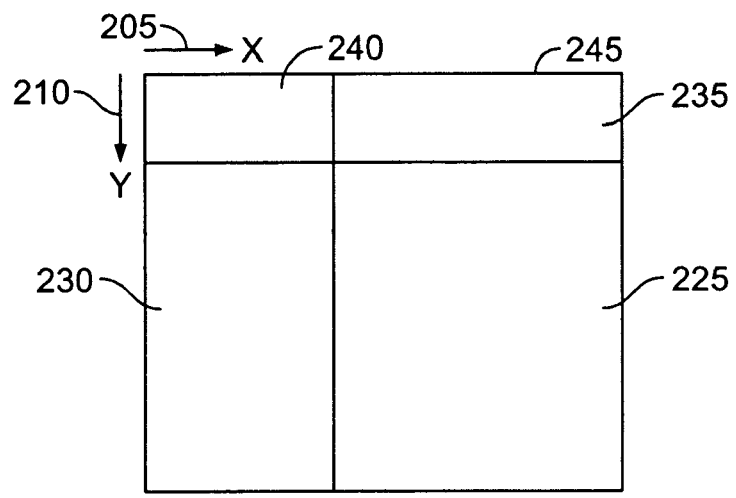

FIGS. 2A and 2B illustrate a technique for shifting an image or a differential representation of an image for producing multiple uncorrelated differential representations. A differential representation of a texture sample region 200 has pixel locations that are arranged in an x direction 205 and a y direction 210. A determination is made that the differential representation of the texture sample region 200 is to be shifted in the x direction 205 by a first delta amount 215 and in the y direction 210 by a second delta amount 220. The differential representation of the texture sample region 200 is, conceptually, segmented into different sub-regions 225, 230, 235, and 240 based on the first delta amount 215 and the second delta amount 220. FIG. 2B illustrates a new and different differential representation 245 that is based on, but uncorrelated with, the differential representation of the texture sample region 200. The new differential representation 245 includes the same regions 225, 230, 235, and 240 as the differential representation of the texture sample region 200 but the regions 225, 230, 235, and 240 are arranged in a different sequence (i.e., they have been shifted in the x and y directions 205 and 210 in a loop-around fashion). The texture sample region 200 can be shifted multiple different times by varying amounts to produce multiple uncorrelated samples that all have the same standard deviation.

Figure 3:
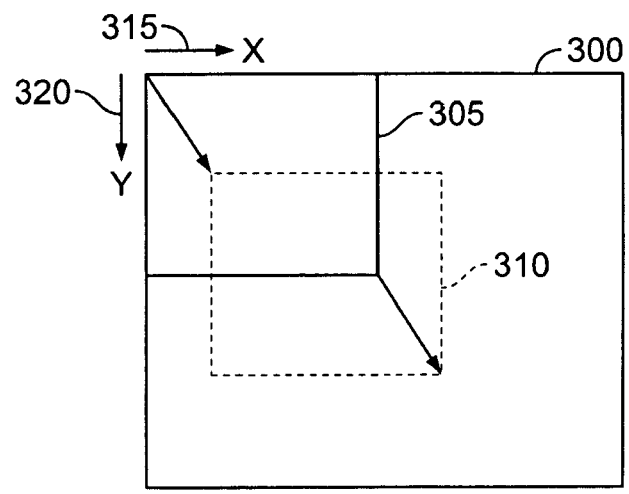
FIG. 3 illustrates another technique for shifting an image or a differential representation of an image for producing multiple uncorrelated differential representations.

FIG. 3 illustrates another technique for shifting an image or a differential representation of an image for producing multiple uncorrelated differential representations. In this technique, a first texture sample 305 is taken from a texture sample region 300. The first texture sample 305 is smaller than the texture sample region 300. A second texture sample 310 is then obtained by shifting, by random or predetermined amounts, a texture sampling window in the x direction 315 and/or the y direction 320 relative to the first texture sample 305. Assuming the texture sample region 300 is a roughly consistent texture (e.g., any given small area within the texture sample region 300 is uncorrelated with and has roughly the same standard deviation as any other small area), the texture sample window can be shifted multiple different times by varying amounts to produce multiple uncorrelated samples that have approximately the same standard deviation.

Figure 4A:
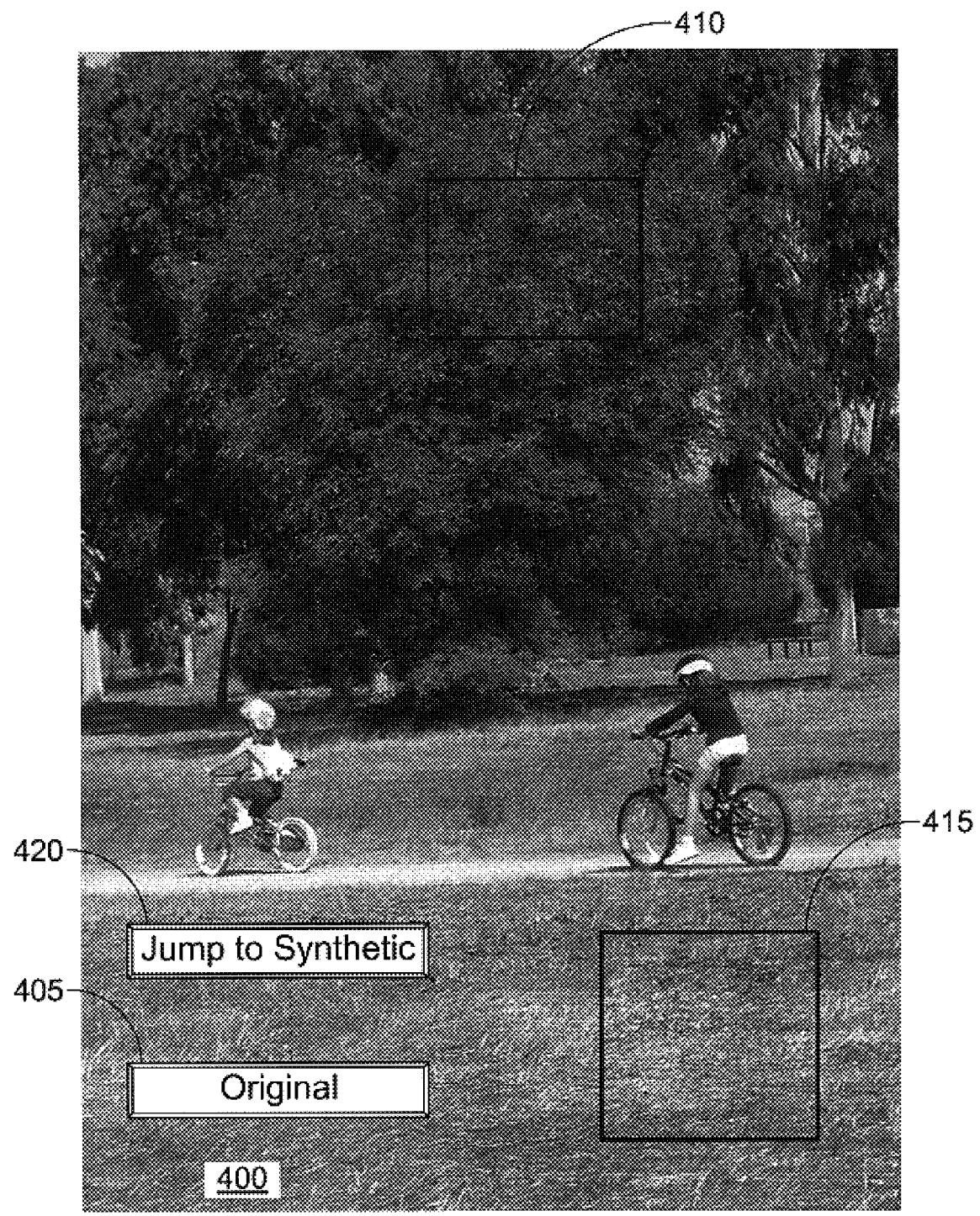
FIGS. 4A and 4B depict an illustrative example of an image being modified using the process of FIG. 1.
Figure 4B:
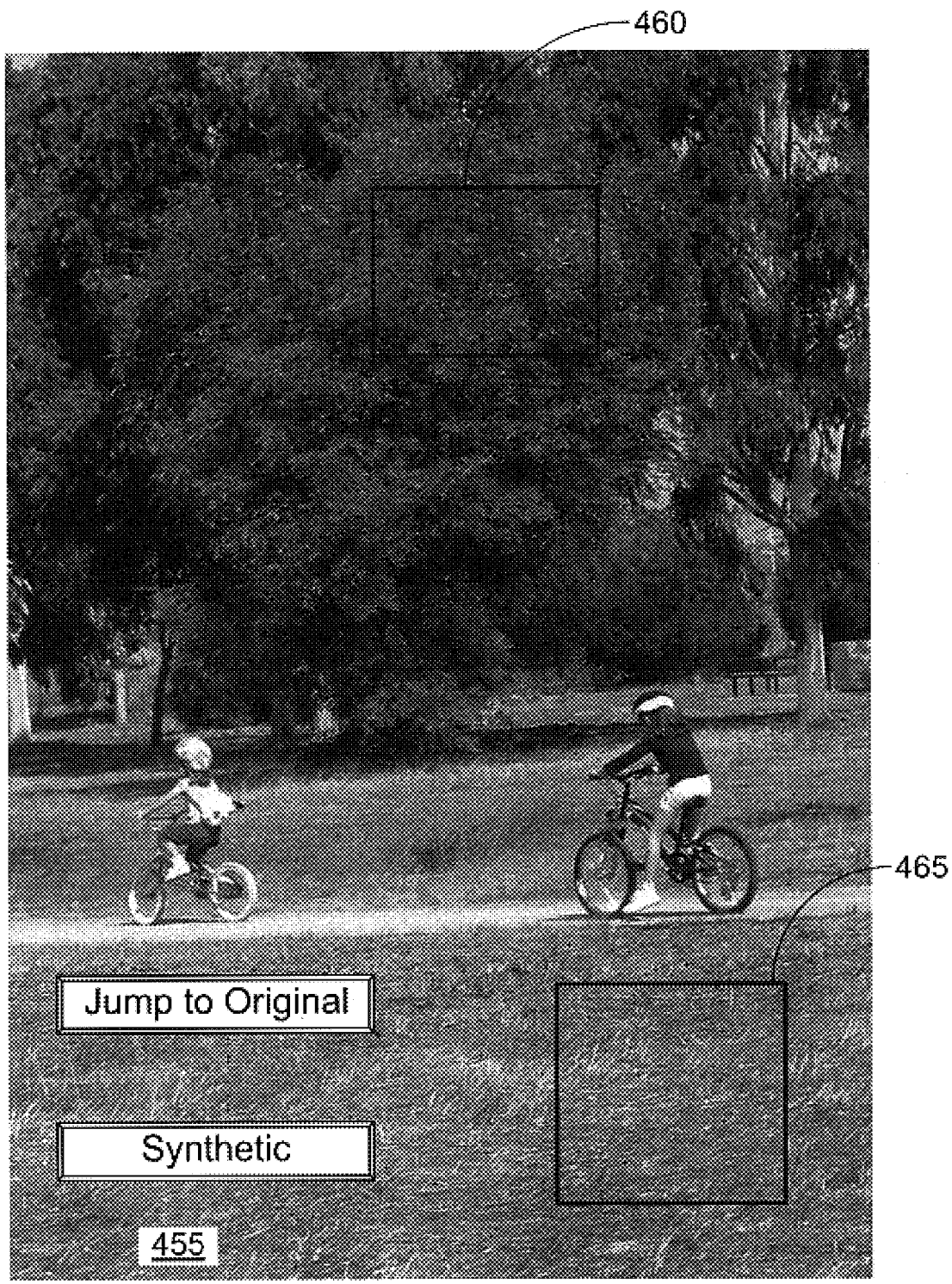

FIGS. 4A and 4B depict an illustrative example of an image being modified using the process of FIG. 1. FIG. 4A shows an original image 400 (as indicated at 405) in which a first modification region 410 and a second modification region 415 have been selected. In this example, the modification regions 410 and 415 are also texture sample regions. Thus, the texture within the first modification region 410 is to be used to produce synthesized texture, which will be inserted in the first modification region 410, and the texture within the second modification region 415 is to be used to produce synthesized texture, which will be inserted in the second modification region 415. A user can switch to a modified image that includes synthesized texture by selecting a "jump to synthetic" button 420. To create the modified image, a differential representation of each texture sample region is generated by calculating a Laplacian derivative of the texture sample region. The differential representation of each texture sample region is shifted multiple times by random amounts in the x and y directions to create multiple different differential representations. The multiple differential representations corresponding to each texture sample region are then weighted and combined, and the combined differential representation is integrated using the portions of the original image 400 that form a boundary around the respective modification regions 410 and 415 as boundary conditions. The resulting image is then inserted in place of the corresponding modification region 410 or 415 to create the modified image.

FIG. 4B shows a modified image 450 (as indicated at 455) generated from the original image 400. The modified image 450 includes a first synthesized region 460 produced from the first texture sample region 410 and a second synthesized region 465 produced from the second texture sample region 415. Although this example illustrates a situation in which the texture sample regions are the same as the modification regions 410 and 415, a typical implementation of the invention uses a modification region that includes some feature to be removed and thus a texture sample region that differs from the modification region is selected.

Figure 5:
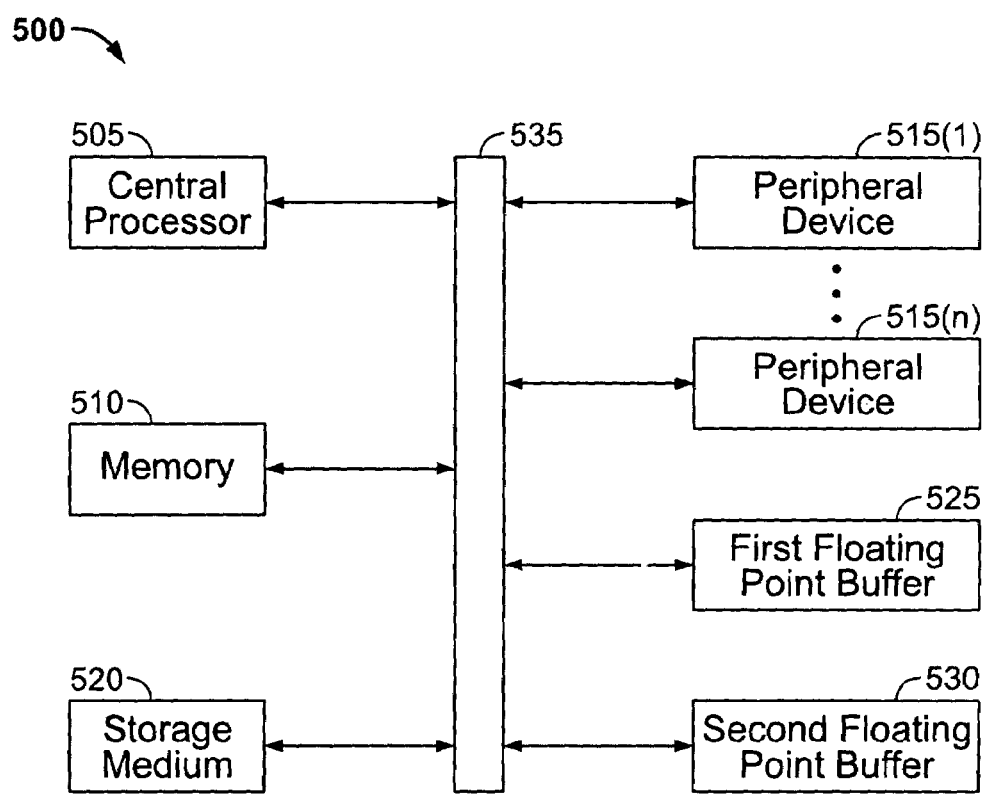
FIG. 5 is a block diagram showing an example image healing system.

FIG. 5 is a block diagram showing an example image healing system 500. The system 500 can be a computer running an image processing application, such as PHOTOSHOP® software, and can include an image-generating device, such as a digital camera or scanner. The system 500 can be an image generating device itself, such as a digital camera, and can include a central processor 505, a memory 510 for storing one or more images, and one or more peripheral devices 515 (1)-515(n), such as a display monitor for displaying images to a user of the system 500. The peripheral devices 515 may also include a sensor array, which allows a user to capture image data, and other user interface devices, such as a mouse. A storage medium 520 may store instructions for processing images, such as for processing images to heal a region of the image. Communications among the different components may be performed using a data bus 535.

Input from a user can be obtained using a user interface, such as that provided by image processing software, or using a simplified mechanical interface. For example, a mouse may be employed by a user to select one or more areas of an image from which to sample texture and to select an area to be healed. The area to be healed may be in the same or a different image as the texture sampling area(s). The processor 505, using instructions stored in the storage medium 520, may calculate a Laplacian or other derivatives of the texture sampling area and may store the result in a first floating point buffer 525. The processor 505, again using instructions stored in the storage medium 520, may also use random shifts of the data stored in the first floating point buffer (e.g., in both the x and y directions) to obtain multiple different samples from the texture sampling area. In accordance with stored instructions, the processor 505 multiplies each of the different samples, as it is obtained, by one divided by the square root of n, where n is the total number of samples/differential representations, and adds the result to a second floating point buffer 530 (i.e., an accumulator) that accumulates the sum of n shifted versions of the Laplacian derivative of the texture sampling area. The floating-point buffers 525 and 530 may be part of the memory 510 and/or may be contained on the storage medium 520.

The processor 505 may then execute instructions stored on the storage medium 520 to solve a Poisson equation with the source term (i.e., the right hand side of the equation) equal to the sum stored in the second floating point buffer 530 and using pixels that surround the area to be healed in the original image as a boundary condition (i.e., the left-hand side of the equation). Solving the Poisson equation results in an integration of the synthesized texture. The solution of the Poisson equation generates synthesized texture into the region to be healed. The integration creates a consistent function such that colors match at the boundaries.

The invention can be implemented in digital electronic circuitry, integrated circuitry, or in computer hardware, firmware, software, or in combinations thereof. Apparatus of the invention can be implemented in a software product (e.g., a computer program product) tangibly embodied in a machine-readable storage device for execution by a programmable processor; and processing operations of the invention can be performed by a programmable processor executing a program of instructions to perform functions of the invention by operating on input data and generating output. The invention can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD (liquid crystal display) screen for displaying information to the user and a keyboard and a pointing device such as a mouse or a trackball by which the user can provide input to the computer system. The computer system can be programmed to provide a graphical user interface through which computer programs interact with users.

A number of implementations have been described. Nevertheless, it will be understood that various modifications may be made. For example, the logic flow depicted in FIG. 1 does not require the particular order shown. In certain implementations, multi-tasking and parallel processing may be preferable. Accordingly, other implementations are within the scope of the following claims.

What is claimed is:

1. A computer-implemented method for generating a portion of an image, the method comprising using a computer to perform the following actions,
obtaining n differential representations of an image texture, with n>1;
modifying the n differential representations by weighting each differential representation using a corresponding coefficient, with a sum of squares of the coefficients equal to a value of approximately one;
combining the n modified differential representations to produce a combined differential representation; and
integrating the combined differential representation to obtain a modified texture region.

2. The method of claim 1 wherein obtaining n differential representations of an image texture comprises:
calculating a differential representation of an original image texture region; and
shifting the differential representation in at least one direction to generate a plurality of shifted versions of the differential representation, with each one of the plurality of shifted versions of the differential representation comprising one of the n differential representations.

3. The method of claim 2 wherein the differential representations are shifted by a random value in at least two directions.

4. The method of claim 1 wherein obtaining n differential representations of an image texture comprises calculating differential representations of each of a plurality of original image texture regions.

5. The method of claim 1 wherein each coefficient is equal to approximately $$\frac{1}{\sqrt{n}}.$$

6. The method of claim 1 wherein the modified texture region replaces a modification region in an original image and integrating the combined differential representation comprises using pixel values from the original image as a boundary condition.

7. The method of claim 6 further comprising:
receiving an identification of the modification region in the original image; and
determining a boundary region in the original image, wherein the boundary region is adjacent to the modification region and comprises the pixel values from the original image that are used as a boundary condition.

8. The method of claim 1 wherein the n differential representations comprise uncorrelated differential representations.

9. The method of claim 1 wherein each of the n differential representations has an average value of approximately zero and the n differential representations have approximately the same standard deviation.

10. The method of claim 1 wherein integrating the combined differential representation to obtain the modified texture region comprises iteratively applying at least one kernel to generate a solution to a partial differential equation having a source term corresponding to the combined differential representation.

11. The method of claim 9 wherein the partial differential equation comprises a Poisson differential equation.

12. The method of claim 1 the n differential representations are of a type selected from a group consisting of a gradient, a Laplacian, a gradient of the Laplacian, and a second Laplacian.

13. A computer-implemented method for modifying an image, the method comprising the method comprising using a computer to perform the following actions,
identifying an area to be replaced in an original image, wherein the original image includes boundary pixels adjacent to the area to be replaced, with each boundary pixel having an associated value;
determining general rates of change between pixels across a region of a texture source image;
generating a first value mapping of the general rates of change, with each value in the first value mapping corresponding to a pixel in the texture source image and indicating a general rate of change between the pixel and at least one adjacent pixel, wherein the values in the first value mapping collectively have an average value and a standard deviation;
generating a plurality of alternative value mappings, with the values in each alternative value mapping collectively having an average value and a standard deviation approximately equal to the average value and the standard deviation of the values in the first value mapping;
combining the first value mapping and the plurality of alternative value mappings to produce combined general rates of change, with the values in each value mapping divided by approximately the square root of a total number of value mappings; and
determining pixel values for a new texture image that exhibit the combined general rates of change and that exhibit consistency with the boundary pixel values in the original image.

14. The method of claim 13 wherein the average value of the values in the first value mapping and the average value of the values in each alternative value mapping are equal to approximately zero.

15. The method of claim 13 wherein each of the plurality of alternative value mappings is generated by shifting the first value mapping in at least one direction.

16. The method of claim 13 wherein each of the plurality of alternative value mappings is generated by determining general rates of change between pixels across a region of a respective alternative texture source image.

17. An article comprising a computer-readable medium storing instructions for causing one or more processors to perform operations comprising:
obtaining n differential representations of an image texture, with n>1;
modifying the n differential representations by weighting each differential representation using a corresponding coefficient, with the sum of the squares of the coefficients equal to a value of approximately one;
combining the n modified differential representations to produce a combined differential representation; and
integrating the combined differential representation to obtain a modified texture region.

18. The article of claim 17 wherein a computer-readable medium stores further instructions for causing one or more processors to perform operations comprising using the modified texture region as a replacement for a modification region of an original image, wherein integrating the combined differential representation comprises using pixel values from the original image as a boundary condition.

19. The article of claim 17 wherein obtaining n differential representations comprises determining derivatives using at least one predefined kernel.

20. The article of claim 17 wherein integrating the combined differential representation to obtain a modified texture region comprises iteratively applying at least one kernel to generate a solution to a partial differential equation having a source term corresponding to the combined differential representation.

21. The article of claim 17 wherein the image texture, the n differential representations, and the modified image correspond to one channel of a multiple channel image.

22. The article of claim 17 wherein obtaining n differential representations of an image texture comprises:
calculating a differential representation of an original image texture region; and
shifting the differential representation in at least one direction to generate a plurality of shifted versions of the differential representation, with each one of the plurality of shifted versions of the differential representation comprising one of the n differential representations.

23. The article of claim 22 wherein the differential representations are shifted by a random value in at least two directions.

24. The article of claim 17 wherein obtaining n differential representations of an image texture comprises calculating differential representations of each of a plurality of original image texture regions.

25. The article of claim 17 wherein each coefficient is equal to approximately $$\frac{1}{\sqrt{n}}.$$

26. A computer-implemented method for modifying an image, the method comprising the method comprising using a computer to perform the following actions,
receiving an identification of a modification region in an original image;
determining a boundary region in the original image, wherein the boundary region is adjacent to the modification region;

generating texture in differential space to produce a synthesized differential representation for the modification region; and integrating the synthesized differential representation to generate a modified image, wherein integrating the synthesized differential representation comprises calculating a solution to a partial differential equation using the boundary region as a boundary condition.

27. The method of claim 26 wherein the partial differential equation includes a source term corresponding to the synthesized differential representation.

28. The method of claim 27 wherein the partial differential equation comprises a Poisson differential equation.

29. The method of claim 26 wherein generating texture in differential space comprises mixing n differential texture samples.

30. The method of claim 29 wherein mixing n differential texture samples comprises:

multiplying each differential texture sample by a corresponding coefficient, with a sum of squares for the coefficients equal to approximately one, to produce n modified differential texture samples; and adding the n modified differential texture together to produce the synthesized differential representation.

31. The method of claim 30 further comprising producing at least one of the n differential texture samples by shifting a first texture sample in at least one direction.

32. A system comprising:

at least one memory adapted to store at least one of image data or instructions for processing image data;

at least one processor configured to:

obtain n differential representations of an image texture, with n>1;

modify the n differential representations by weighting each differential representation using a corresponding coefficient, with a sum of squares of the coefficients equal to a value of approximately one;

combine the n modified differential representations to produce a combined differential representation; and integrate the combined differential representation to obtain a modified texture region.

33. The system of claim 32 wherein obtaining n differential representations of an image texture comprises, for each of a plurality of original image texture regions:

calculating a differential representation of an original image texture region; and shifting the differential representation in at least one direction to generate a plurality of shifted versions of the differential representation, with each one of the plurality of shifted versions of the differential representation comprising one of the n differential representations.

34. The system of claim 32 wherein each coefficient is equal to approximately $$\frac{1}{\sqrt{n}}.$$

35. The system of claim 32 wherein the at least one processor is further configured to:

replace a modification region in an original image with the modified texture region; and integrate the combined differential representation using pixel values from the original image as a boundary condition.

36. The system of claim 32 wherein each of then differential representations has an average value of approximately zero and the n differential representations have approximately the same standard deviation.

37. The system of claim 32 wherein the at least one processor is further configured to integrate the combined differential representation to obtain the modified texture region by iteratively applying at least one kernel to generate a solution to a partial differential equation having a source term corresponding to the combined differential representation.

38. An article comprising a computer-readable medium storing instructions adapted to cause data processing apparatus to perform operations comprising:

identifying an area to be replaced in an original image, wherein the original image includes boundary pixels adjacent to the area to be replaced, with each boundary pixel having an associated value;

determining general rates of change between pixels across a region of a texture source image;

generating a first value mapping of the general rates of change, with each value in the first value mapping corresponding to a pixel in the texture source image and indicating a general rate of change between the pixel and at least one adjacent pixel, wherein the values in the first value mapping collectively have an average value and a standard deviation;

generating a plurality of alternative value mappings, with the values in each alternative value mapping collectively having an average value and a standard deviation approximately equal to the average value and the standard deviation of the values in the first value mapping;

combining the first value mapping and the plurality of alternative value mappings to produce combined general rates of change, with the values in each value mapping divided by approximately the square root of a total number of value mappings; and determining pixel values for a new texture image that exhibit the combined general rates of change and that exhibit consistency with the boundary pixel values in the original image.

39. The article of claim 38 wherein the average value of the values in the first value mapping and the average value of the values in each alternative value mapping are equal to approximately zero.

40. The article of claim 38 wherein each of the plurality of alternative value mappings is generated by shifting the first value mapping in at least one direction.

41. The article of claim 38 wherein each of the plurality of alternative value mappings is generated by determining general rates of change between pixels across a region of a respective alternative texture source image.

42. A system comprising:

at least one memory adapted to store at least one of image data or instructions for processing image data;

at least one processor configured to:

identify an area to be replaced in an original image, wherein the original image includes boundary pixels adjacent to the area to be replaced, with each boundary pixel having an associated value;

determine general rates of change between pixels across a region of a texture source image;

generate a first value mapping of the general rates of change, with each value in the first value mapping corresponding to a pixel in the texture source image and indicating a general rate of change between the pixel and at least one adjacent pixel, wherein the values in the first value mapping collectively have an average value and a standard deviation;

generate a plurality of alternative value mappings, with the values in each alternative value mapping collectively having an average value and a standard deviation approximately equal to the average value and the standard deviation of the values in the first value mapping;

combine the first value mapping and the plurality of alternative value mappings to produce combined general rates of change, with the values in each value mapping divided by approximately the square root of a total number of value mappings; and determine pixel values for a new texture image that exhibit the combined general rates of change and that exhibit consistency with the boundary pixel values in the original image.

43. The system of claim 42 wherein the average value of the values in the first value mapping and the average value of the values in each alternative value mapping are equal to approximately zero.

44. The system of claim 42 wherein each of the plurality of alternative value mappings is generated by determining general rates of change between pixels across a region of a respective alternative texture source image.

45. An article comprising a computer-readable medium storing instructions adapted to cause data processing apparatus to perform operations comprising:

receiving an identification of a modification region in an original image;

determining a boundary region in the original image, wherein the boundary region is adjacent to the modification region;

generating texture in differential space to produce a synthesized differential representation for the modification region; and integrating the synthesized differential representation to generate a modified image, wherein integrating the synthesized differential representation comprises calculating a solution to a partial differential equation using the boundary region as a boundary condition.

46. The article of claim 45 wherein the instructions are adapted to cause data processing apparatus to generate texture in differential space by:

multiplying each differential texture sample by a corresponding coefficient, with a sum of squares for the coefficients equal to approximately one, to produce n modified differential texture samples; and adding the n modified differential texture together to produce the synthesized differential representation.

47. A system comprising:

at least one memory adapted to store at least one of image data or instructions for processing image data;

at least one processor configured to:

receive an identification of a modification region in an original image;

determine a boundary region in the original image, wherein the boundary region is adjacent to the modification region;

generate texture in differential space to produce a synthesized differential representation for the modification region; and integrate the synthesized differential representation to generate a modified image, wherein integrating the synthesized differential representation comprises calculating a solution to a partial differential equation using the boundary region as a boundary condition.

48. The system of claim 47 wherein the at least one processor is configured to generate texture in differential space by:

multiplying each differential texture sample by a corresponding coefficient, with a sum of squares for the coefficients equal to approximately one, to produce n modified differential texture samples; and adding the n modified differential texture together to produce the synthesized differential representation.

* * * * *

UNITED STATES PATENT AND TRADEMARK OFFICE
CERTIFICATE OF CORRECTION

PATENT NO. : 7,577,313 B1
APPLICATION NO. : 10/842920
DATED : August 18, 2009
INVENTOR(S) : Todor G. Georgiev It is certified that error appears in the above-identified patent and that said Letters Patent is hereby corrected as shown below:

Title Page:
    left column, insert:
        --Related U.S. Application Data
    (63)   Continuation of application no. 10/748,013, filed on December 30, 2003, now U.S. Patent 7,558,433.--

Claim 1:
    column 14, line 29:
        delete "comprising using a computer to perform the following actions,", and replace with --comprising: using a computer to perform the following actions,--

Claim 12:
    column 14, line 25:
        after "claim 1", insert --, wherein--

Claim 13:
    column 15, line 30:
        delete "comprising the method comprising using a computer to perform the following actions,", and replace with --comprising: using a computer to perform the following actions,--

Claim 26:
    column 16, line 61:
        delete "comprising the method comprising using a computer to perform the following actions,", and replace with --comprising: using a computer to perform the following actions,--

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,577,313 B1 |
| APPLICATION NO. | : 10/842920 |
| DATED | : August 18, 2009 |
| INVENTOR(S) | : Todor G. Georgiev |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 801 days Delete the phrase "by 801 days" and insert -- by 846 days --

Signed and Sealed this

Thirteenth Day of April, 2010

David J. Kappos
*Director of the United States Patent and Trademark Office*